United States Patent
Schade

(10) Patent No.: US 6,807,767 B1
(45) Date of Patent: Oct. 26, 2004

(54) SMALL ANIMAL TRAP WITH INFRARED TRIGGER

(76) Inventor: James Frederick Schade, 25166 Kerri La., Ramona, CA (US) 92065

(*) Notice: Subject to any disclaimer, the term of this patent is extended or adjusted under 35 U.S.C. 154(b) by 0 days.

(21) Appl. No.: 10/605,739

(22) Filed: Oct. 22, 2003

(51) Int. Cl.[7] .............................................. A01M 23/30
(52) U.S. Cl. ......................................................... 43/77
(58) Field of Search ............................... 43/73, 75, 77, 43/81–83.5

(56) References Cited

U.S. PATENT DOCUMENTS

| | | | | |
|---|---|---|---|---|
| 4,641,456 A | * | 2/1987 | Boharski | 43/73 |
| 5,154,017 A | * | 10/1992 | Disalvo | 43/81 |
| 5,184,416 A | * | 2/1993 | Brewer | 43/81 |
| 5,185,953 A | * | 2/1993 | Gross | 43/58 |
| 5,477,635 A | * | 12/1995 | Orsano | 43/81 |
| 5,815,982 A | * | 10/1998 | Garretson | 43/121 |
| 5,953,853 A | * | 9/1999 | Kim | 43/98 |
| 6,137,415 A | * | 10/2000 | Rast | 340/573.2 |
| 6,718,688 B2 | * | 4/2004 | Garretson | 43/121 |

* cited by examiner

Primary Examiner—Michael J. Carone
Assistant Examiner—Bret Hayes

(57) ABSTRACT

A spring biased trap includes two light sources (60 and 62) and two light sensors (61 and 63) acting together to detect the position of the small animal to be trapped. A baited trapping chamber restricts the animal's entrance orientation and also contains a spring biased bail (30) that is horizontally pivoted about midway between the roof (20) and base (21) and near the partition (24). The bail (30) is restrained or released by a release device (40). A solenoid armature (72) holds the P-shaped rod in the held position which holds the release device (40) in the retained position until the solenoid (70) is energized. A cocking yoke (50) is used for unloading and resetting the trap easily and safely. A daylight sensor (64) protects birds by disabling the trap during the daylight hours. A light source (65) and a sensor (66) detect that the trap has tripped and sends a signal to the user that the trap needs attention.

11 Claims, 8 Drawing Sheets

US 6,807,767 B1

SMALL ANIMAL TRAP WITH INFRARED TRIGGER

BACKGROUND OF INVENTION

Figure 1:
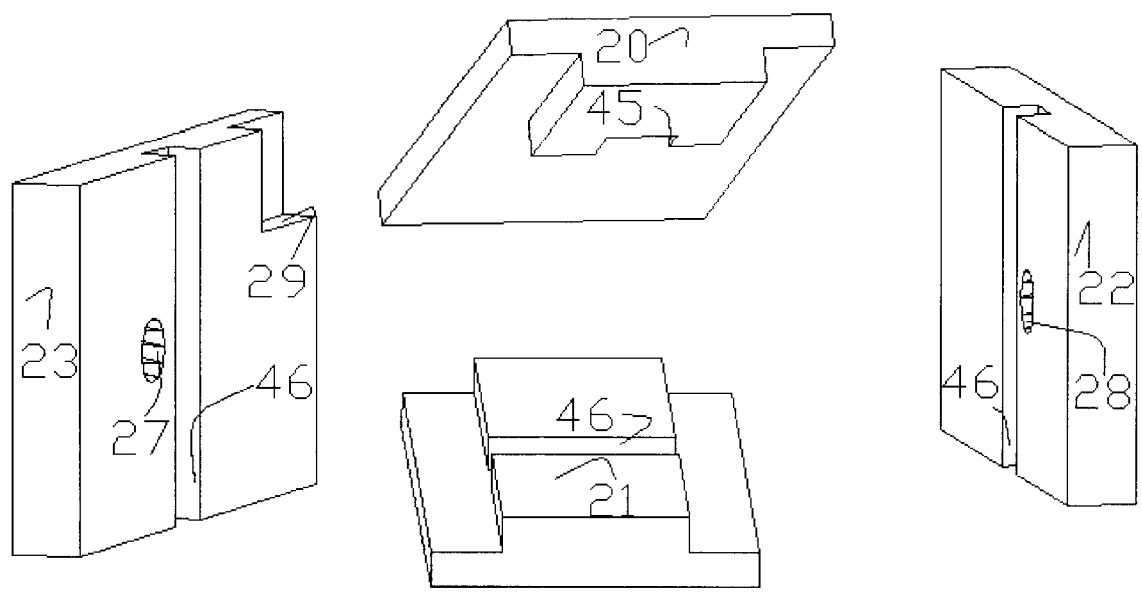

Conventional spring-biased rat and mousetraps depend on the small animal to supply the energy needed to move the triggering mechanism from the set position to the tripped position. The triggers are not sensitive enough to catch small animals who may make repeated trips gently removing some or all of the bait.

Almost every user of conventional spring-biased rat and mousetraps can recall painful experiences. Although the triggers lack the sensitivity needed to catch a small animal stealing the bait, they are very unforgiving to any user who is not careful enough.

Spring-biased traps are most effective when the small animal enters from the front end of the trap. The conventional traps permit the small animal to enter the trap from any angle. This results in unpredictable results. Sometimes a poorly aligned small animal will survive with little or no injuries or dies a slow painful death. Removing a trapped but injured rat or mouse is sometimes dangerous and always unpleasant.

Conventional rat traps require a considerable amount of strength to set. Removing dead or injured small animals while avoiding contact is difficult because of the poor mechanical advantage that is provided to reset the strong springs.

Conventional rat traps are too large to trap mice or small rats effectively and conventional mousetraps are too weak to effectively kill rats.

If a conventional trap is set outside, there is a possibility that it may kill a bird.

The conventional trap does not signal when tripped.

BACKGROUND PRIOR ART

The prior art is replete with a wide assortment of small animal traps of the general class to which this invention pertains. The existing traps, however, are deficient in certain respects when the traps are used to remove unwanted small animals from an area.

Many of the prior art small animal traps are made using custom-made mechanical parts. These parts require special skills and special machinery to make. Making these parts is beyond the ordinary skills of most who are considered skilled in the art of small animal trap making. The cost of having a small number of these custom-made parts made is generally very high. The present invention has no custom-made parts. Most home workshops have all the equipment needed to build the present invention. A person skilled in the art of building small animal traps should be able to build one from parts that are available from most hardware stores or home improvement centers. All the electronic parts are available from most electronic parts stores.

Many of the prior art small animal traps use expensive high powered electric solenoids, electric motors, power transformers or expensive batteries. The present invention uses only one low power solenoid. It has no costly electric motors, power transformers or expensive batteries. The battery model can run on low cost batteries.

This electronically controlled trap trips when the small animal breaks a light beam. All the energy needed to trip the trap is supplied by the trap and the small animal only needs to supply a shadow. It is much more sensitive than the conventional spring-biased trap. The trap is very easy to set and once it is set will not be tripped accidentally by the normal handling needed to place the trap into position. The user's hands and fingers never need to enter an area where they may be injured.

This trap allows the entry of the small animal only from the front direction. It will trip only when the small animal is in a good position for the predictable deadly results. In the unlikely event that a small animal is trapped but not killed, the small animal can be removed easily without the user making contact with the animal.

This trap will quickly kill large rats, small rats and mice.

This trap has a cocking yoke that gives the user a good mechanical advantage to set, empty and reset the trap. It is easy to reset the trap and to remove a dead rat or mouse without making any contact with the dead rat or mouse. The user does not need to have strong hands and fingers to set, empty and reset this trap. There is little danger of being accidentally injured while setting, emptying, or resetting this trap.

This electronically controlled small animal trap has a daylight sensor that can be programmed to disable the trap during the daylight hours. The disabled trap will not harm birds or other small animals that are only active during the daylight hours. This function can be disabled if it is not needed.

The trap has an entrance that a large rat has to squeeze into. Pets and other animals that are larger than a rat can't get their face into the bail striking area of this trap.

This electronically controlled small animal trap can be programmed to signal when tripped or to remain silent.

BACKGROUND-FIELD OF INVENTION

This invention relates to a spring biased small animal trap; specifically a trap that is triggered by a small animal breaking a light beam.

SUMMARY OF THE INVENION

Therefore, it is the object of this invention to provide a small, low cost, reusable small animal trap that is easy to set and easy to unload. It is another object of this invention to provide a small animal trap that is highly effective at killing both rats and mice and will not kill birds. It is another object of this invention to provide a small animal trap that is capable of signaling the user when the trap has been tripped.

BRIEF DESCRPTION OF DRAWINGS

FIG. 1 Perspective view of the top, base, and sides

Figure 2:
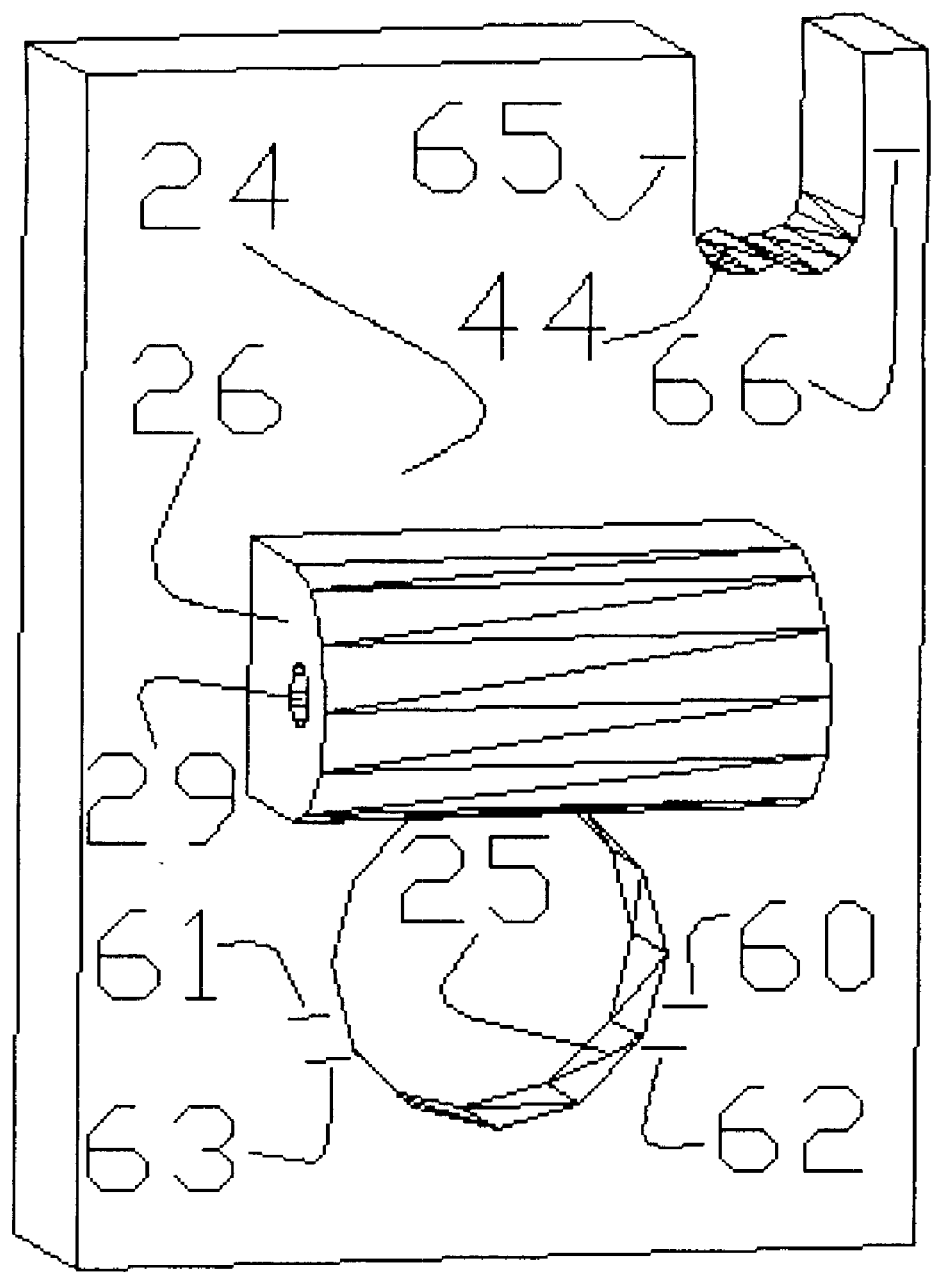

FIG. 2 Front perspective view of the partition

Figure 3:
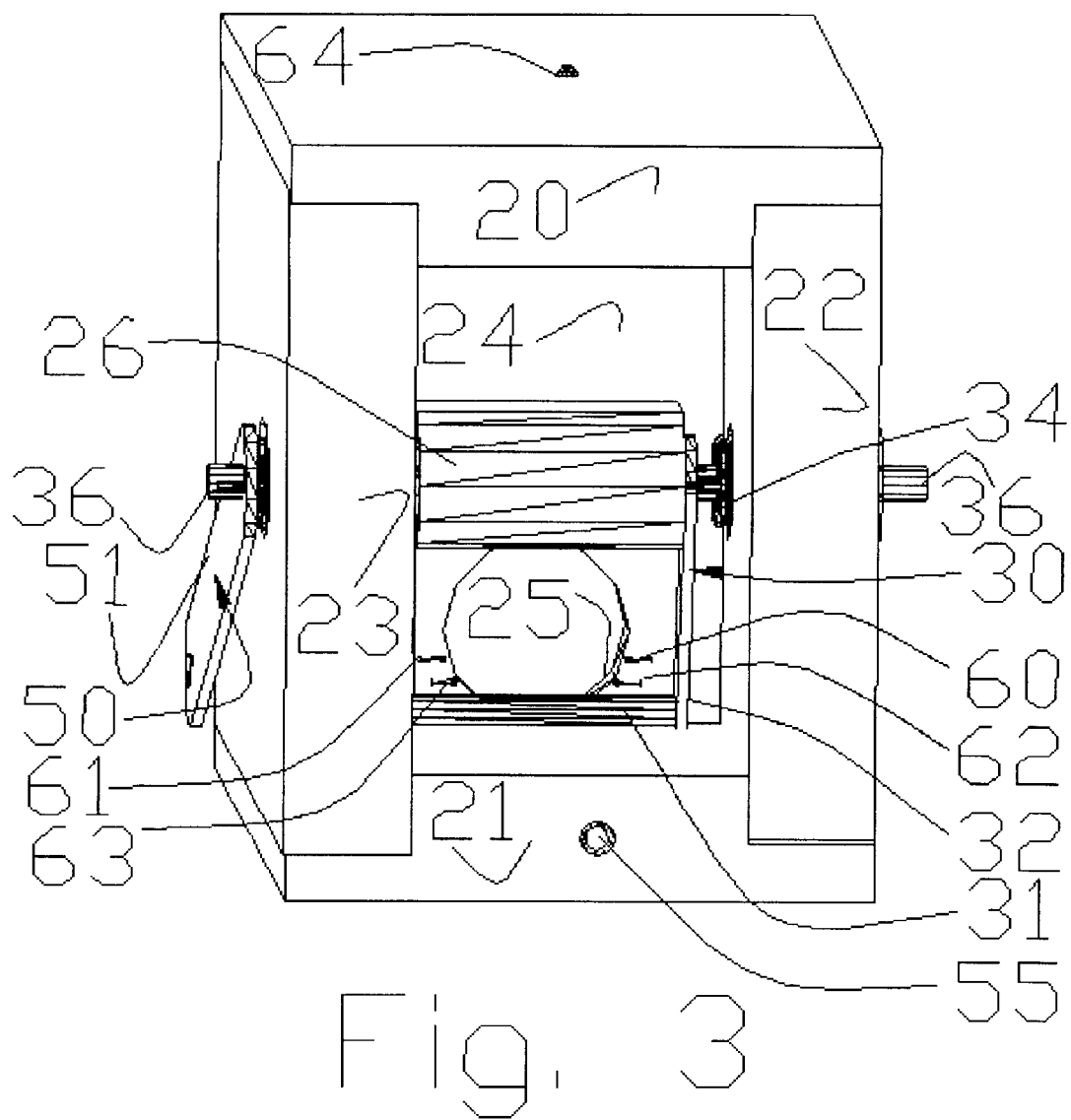

FIG. 3 Front perspective view of the trap in the tripped mode

Figure 4:
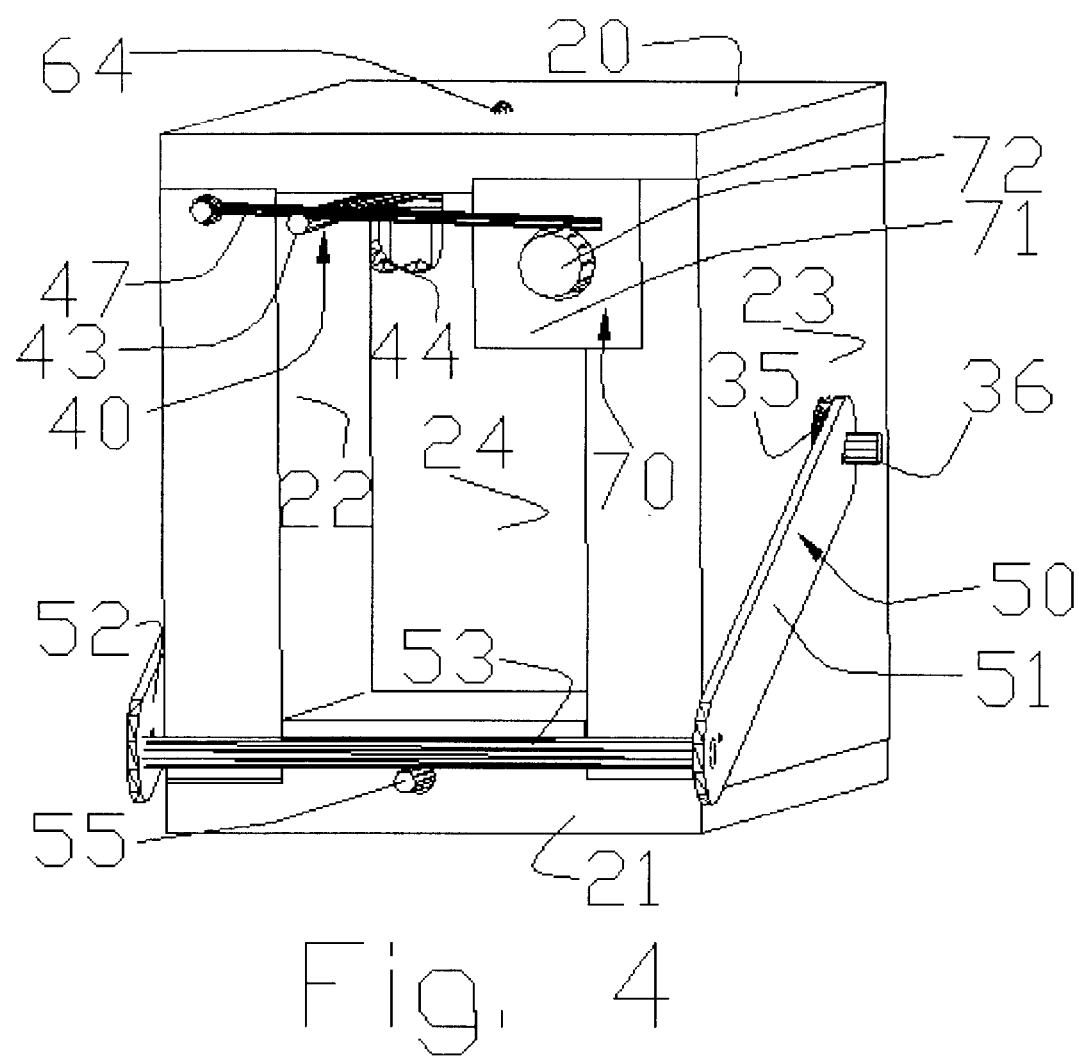

FIG. 4 Rear perspective view of the trap in the set mode

Figure 5:
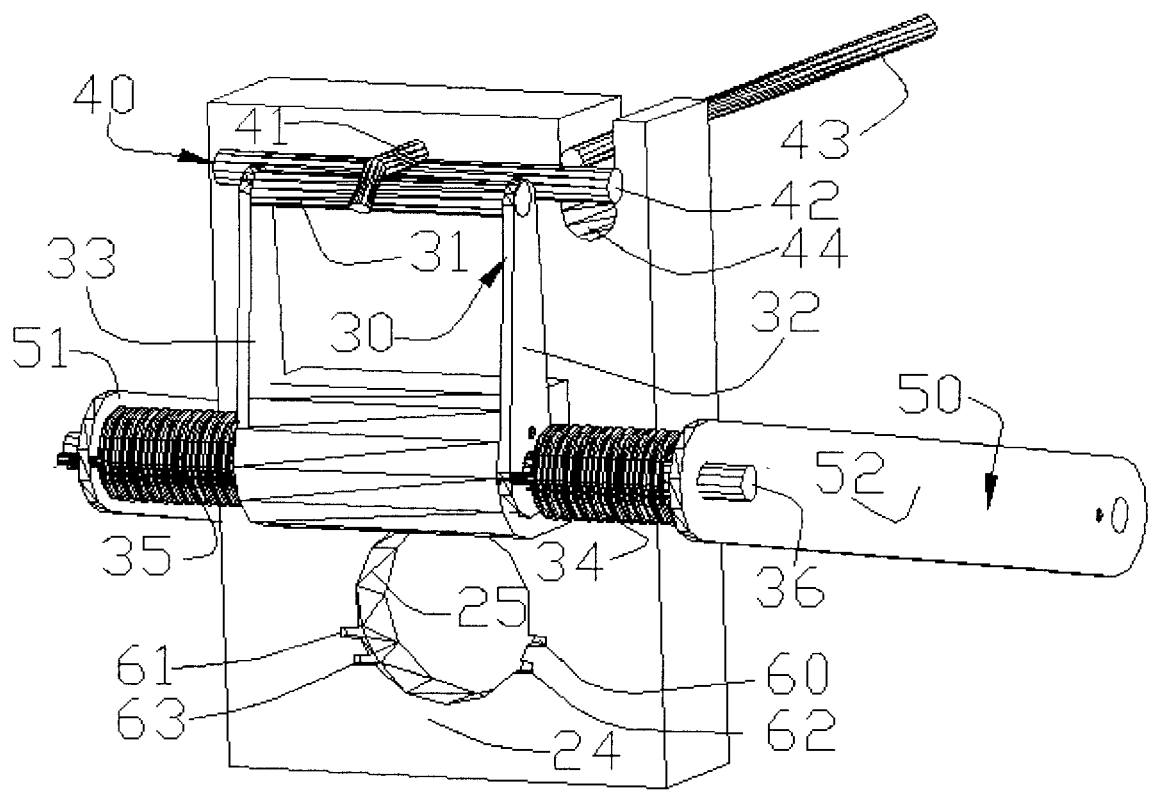
Figure 6:
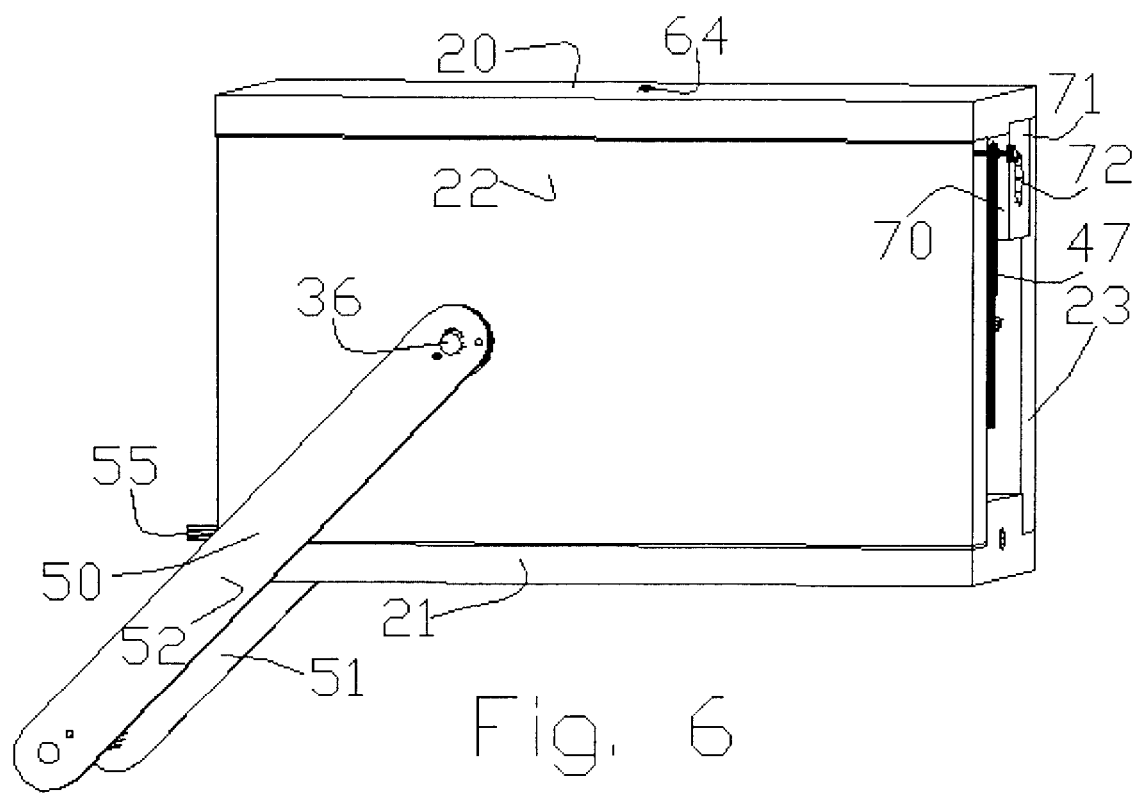
Figure 7:
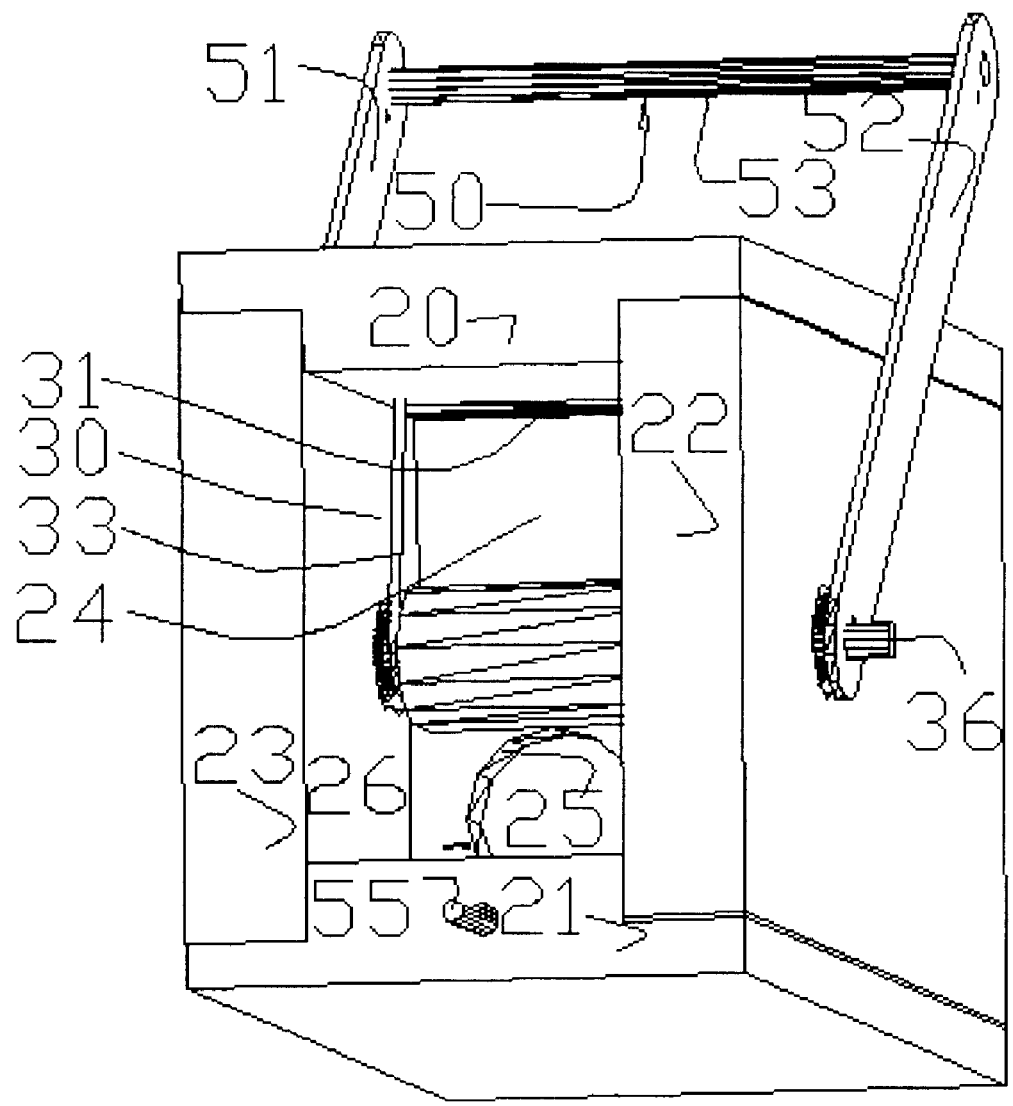
Figure 8:
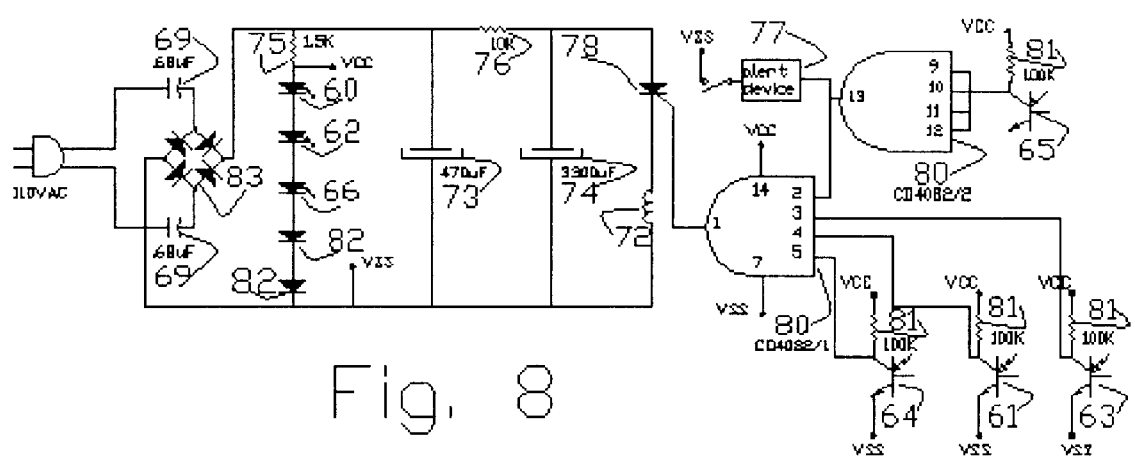

FIG. 5 Front perspective view of the partition with the bail, release device, springs and cocking yoke in the set position FIG. 6 Side perspective view of the trap in the unload position FIG. 7 Front perspective view of the trap in the reset position FIG. 8 Electronic schematic of the circuit Reference number used in the preferred embodiment drawings 20 roof
21 base
22 right wall
23 left wall
24 partition
25 short dead end tunnel
26 shelf 27 hole in the left wall for the axle
28 hole in the right wall for the axle
29 hole in the shelf for the axle
30 bail
31 bail striking bar
32 right side of the bail
33 left side of the bail
34 right bail coil spring
35 left bail coil spring
36 axle
40 release lever
41 release lever retention pin
42 release lever pivot bar
43 release lever
44 notch in the partition for the release lever
45 cutout in the roof for the retention pin
46 dado cut for partition
47 P-shaped rod
50 cocking yoke
51 left cocking lever
52 right cocking lever
53 cocking yoke connecting bar
54 cocking lever locking pin
60 top infrared light emitting diode
61 top infrared phototransistor
62 bottom infrared light emitting diode
63 bottom infrared phototransistor
64 infrared phototransistor daylight sensor
65 infrared phototransistor release lever position sensor
66 infrared light emitting diode release lever position detector
69 0.68 uF capacitor
70 solenoid
71 solenoid coil
72 solenoid armature
73 470 uF capacitor
74 3300 uF capacitor
75 1.5 K resistor
76 10 K resistor
77 alert device
78 silicon controlled rectifier
80 CD 4082 CMOS dual 4 input AND gate integrated circuit
81 100 K resistor
82 1N007 power diode
83 full wave bridge rectifier

DETAILED DESCRIPTION

Description of Invention-Preferred Embodiment

Trap orientation

The front end of the trap is the end where the small animal enters the trap. The other end is the rear of the trap. As the small animal enters the trap, the small animal's right side will be on the right side of the trap and the small animal's left side will be on the left side of the trap.
the trap has 7 main components
1. Main Trap Body
the trap has four positions:
(1) the cocked and ready position
(2) the tripped position
(3) the unload position
(4) the resetting position
2. Bail 30
the bail 30 has two positions:
(1) the set position
(2) the tripped position
3. Solenoid 70
the solenoid 70 has two positions:
(1) the energized position
(2) the not energized position
4. The Cocking Yoke 50
the cocking yoke 50 has three positions:
(1) the cocked/tripped position
(2) the unload position
(3) the setting position
5. The Release Device 40
the release device 40 has two positions:
(1) the released position
(2) the not released position
6. The Cocking Yoke Locking Pin
the cocking yoke locking pin has two positions:
(1) the locked position
(2) the unlocked position
7. The P-Shaped Rod
the P-shaped rod has two positions:
(1) the held position
(2) the not held position
Description of the main trap body Referring to FIG. 1. The main trap body can be made of wood, plastic or similar material. It has 5 separate pieces that are coupled together. It has a roof 20, a base 21, a left wall 23, a right wall 22 and a partition 24. If the four rectangular parts 20–23 were assembled without the partition 24, the structure would be a square tube just large enough for a rat to pass through the opening in the tube.

Referring to FIG. 2, The partition 24 is added about midway between the front end and the rear end of the trap dividing the trap into a front chamber and a rear chamber. Referring to FIG. 3. The chamber in front has the roof 20, the base 21, the left wall 23, the right wall 22 and the partition 24. The rear chamber is about the same as the front chamber. Referring to FIG. 4. The rear chamber has the roof 20, the base 21, the left wall 23, the right wall 22 and the partition 24. The partition 24 is common to both the front chamber and the rear chamber.

Referring back to FIG. 2. There is a short dead end tunnel 25 cut into the lower front face of the partition 24 for holding bait and housing the light emitting diodes and phototransistors 60–63. The short dead end tunnel 25 is cut about half way through the partition 24. The light emitting diodes 60 and 62 and the phototransistors 61 and 63 that are used as the triggering sensors are located in the lower sidewalls of this dead end tunnel 25. Only a small part of these sensors can be seen in FIG. 2.

Protruding from the vertical center of the front face, there is a horizontal shelf 26. The shelf is centered horizontally and there is a gap between the ends of the shelf and the side walls large enough for the sides of the bail 32 and 33 to fit into. There is a hole 29 drilled horizontally through the shelf 26. Referring back to FIG. 1. There is a hole 27 in the left wall 23 and a similar hole 28 in the right wall 22. The holes in the side walls are aligned with the hole 29 in the shelf 26 and the axle 36 will pass through all of these holes 27, 28 and 29.

The roof 20 has a cutout area 45. When the retention pin 41 is in its top position it needs this extra space. All the trapping is done in the front chamber and the rear chamber contains the electronics.

Description of the bail

Referring to FIG. 5. The bail is shaped like the letter U. The bail striking bar 31, the right side of the bail 32 and the left side of the bail 33 are coupled together and work as a one-piece unit bail 30. The sides of the bail 32 and 33 have holes at one end. Referring to FIG. 7. The ends with the holes are placed in the gap between the shelf 26 and the side walls 22 and 23. The axle 36 passes through the holes 27 and 28 in the side walls 22 and 23 through the holes in the sides of the bail 32 and 33 and the hole 29 through the shelf 26. The bail striking bar 31 is free to rotate around the axle 36 from the set position near the roof of the chamber 20 to the tripped position near the base 21 as seen in FIG. 3.

Description of the solenoid

Referring to FIG. 4. The solenoid has two parts. The moving solenoid armature 72 and the stationary solenoid coil 71. The two parts working together as a single unit is called the solenoid 70. The trap can be held in the set position by manually pulling the solenoid armature 72 out of the solenoid coil 71. When power is applied to the solenoid 70, the armature 72 will pull back into the solenoid coil 71 and the bail will move to the tripped position. The solenoid is a small low power device. Smaller solenoids than those shown in the drawings also work well.

Cocking yoke construction details

Referring to FIG. 7. The cocking levers 51 and 52 are made from flat metal and the connecting bar 53 is made of metal rod. The cocking lever connecting bar 53 connects to the two side bars 51 and 52 forming the U-shaped cocking yoke 50 that functions as a one piece unit.

Description of spring connection details

Referring to FIG. 5. The outermost end of the left bail coil spring 35 is coupled to the left cocking lever 51. The innermost end of the left bail coil spring 35 is coupled to the left side of the bail 33. The outermost end of the right bail coil spring 34 is coupled to the right cocking lever 52. The innermost end of the right bail coil spring 34 is coupled to the right side of the bail 32. A change in the position of the cocking yoke 50 will change the amount of spring force exerted on the bail 30.

Release device construction details

Referring to FIG. 5. The release lever pivot bar 42 is positioned horizontally near the top of the front chamber near the partition 24 and extends part way into each of the side walls 22 and 23. The side walls become a bearing surface for the ends of the pivot bar 42 as it rotates. The front end of the release lever 43 couples to the right side of the release lever pivot bar 42. The rear end of the release lever 43 extends beyond the rear of the trap and when the lever is moved up or down the release lever pivot bar 42 will rotate. The rear end of the release lever retention pin 41 is coupled to the center of the release lever pivot bar 42. The retention pin 41 extends forward for a short distance then bends downward for a short distance. The short downward bent end of the retention pin 41 will hold the bail striking bar 31 in the set position while the rear end of the release lever 43 is held up. If the rear end of the release lever is not held up, the force of the springs acting on the bail 30 will force the retention pin 41 up and the trap will trip. The release lever pivot bar 42, the release lever 43 and the release lever retention pin 41 are all made from metal rod and are all coupled together and work as a one-piece unit release device 40.

Description of the cocking yoke locking pin

Referring to FIG. 4. A cocking yoke locking pin 55 is made of metal rod. The cocking yoke locking pin 55 fits into a hole drilled through the long axis of the base 21. When the bail 30 is in the bail set position and the cocking yoke 50 is in the yoke's cocked/tripped position, there is a strong spring force urging the yoke 50 back towards the yoke unload position. When the cocking yoke locking pin 55 is pushed towards the rear of the trap, the cocking lever locking pin 55 will extend under the cocking lever connecting rod 54. This will lock the cocking yoke 50 in the cocked/tripped position.

Description of the sensors locations

Referring to FIGS. 2 and 3. The small animal position detection sensors 60–63 are located in the sidewalls of the short dead end tunnel 25 which is in the lower front face of the partition 24. The infrared light emitting diodes 60 and 62 are placed inside the right tunnel sidewall and the phototransistors 61 and 63 are placed directly across the tunnel 25 inside the left sidewall. The sensors are a short distance from the bottom and are near the forward edge of the tunnel 25. There are small holes in the sidewall extending from each sensor into the tunnel 25. Two beams of light from the two light emitting diodes travel out the two holes in the right wall, across the tunnel and into the holes in the left tunnel wall turning on the phototransistors. The two phototransistors 61 and 63 sense the light and each phototransistor will send a signal to the electronics. Two beams are used to prevent insects and other tiny animals from tripping the trap.

Referring to FIG. 2. There is a notch 44 cut out of the top right side of the partition 24. The release lever 43 travels through this notch. An infrared light emitting diode release lever position detector 66 is located inside the right wall of the notch 44 and there is a small hole in the notch sidewall for the light to pass out of. Inside the left sidewall of the notch 44 there is an infrared phototransistor release lever position sensor 65. There is also a small hole in the left sidewall for light from the light emitting diode 66 to enter.

When release device 40 is in the retained position, it will be blocking the beam of light between the light emitting diode 66 and the phototransistor 65. When the release device 40 is in the released position, the beam will be unbroken. If the beam is unbroken, then the trap has been tripped. Any power to the solenoid 70 will be turned off and a signal will be sent to the alert device 77.

Referring to FIG. 3. An infrared phototransistor daylight sensor 64 is located inside the roof 20 and has a hole looking out. When the phototransistor 64 sees daylight, it will be turned on and the trap will be disabled. When it is dark, the phototransistor 64 will be off and the trap will be enabled. The light entering the hole can be intentionally blocked, which turns the phototransistor 64 off and prevents the sensor from disabling the trap.

Description of the P-shaped rod 45

Referring to FIG. 4. The P-shaped rod 47 is made of thin metal rod and has an offset loop at one end which gives it the shape of the letter P. The loop end is connected high on the back face of the right wall where it is free to rotate around the attachment point. With the bail 30 in the set position and the rear end of the release lever 43 all the way up, the P-shaped rod 47 is rotated under the release lever 43 and the end of the P-shaped rod 47 is placed above the armature of the solenoid 72 and then the armature 72 is manually pulled out of the solenoid coil 71. The armature 72 will be in the not energized position holding the P-shaped rod 47 in the held position which will hold the release lever 43 up in the not released position. When the armature 72 is pulled in to the energized position, the P-shaped rod 47 will rotate down to the not held position which allows the release lever 43 to drop down to the released position and the trap will be tripped.

Description of the operation

Description of the first of the four trap positions: The cocked and ready position.

The bail striking bar 31 will be up in the set position. The bail coil springs 34 and 35 will be exerting a strong force urging the bail towards the tripped position. The release device 40 will be in the not released position with the front down and the rear up. Locking pin 55 will be in the locked position holding the cocking yoke 50 in the cocked/tripped position. Some of the force of the coil springs 34 and 35 acting on the bail 30 will be transferred to the release device 40. This force will urge the front of the release device 40 up and the rear of the release device 40 down. This downward force will push the release lever 43 down pushing down on the P-shaped rod 47 which is in the held position. The solenoid armature 72 is in the not energized position keeping the P-shaped rod 47 from moving down until the solenoid 70 is energized.

Description of the second of the four trap positions: The tripped position.

When both the top and bottom phototransistors sense that there is a small animal that is in the correct position, the electronics activates the solenoid 70. The solenoid armature 72 pulls into the energized position and the P-shaped rod 47 rotates down to the not held position allowing the release device 40 to drop down to the released position. The front end of the release device 40 and the retention pin 41 move up which releases the bail striking bar 31. The bail 30 is driven down to the tripped position by the bail coil springs 34 and 35. The bail striking bar 31 will hit a rat in the back of the head and deliver a lethal injury. If it were a smaller animal it will hit lower, but in all cases the animal is killed quickly. Because all animals are in a similar position when the trap is tripped, the results are predictable.

Description of the third of the four trap positions: The unload position.

To remove the dead small animal from the trap takes three steps.

Description of the first of three steps to unload the trap

The user holds the cocking yoke 50 above the cocked/tripped position while pushing the cocking yoke locking pin 55 forward to the unlocked position. A medium spring tension will be urging the cocking yoke 40 towards the unload position.

Description of the second of three steps to unload the trap

While holding the trap over a container, the user positions the trap so the front face is down.

Description of the third of three steps to unload the trap

The user rotates the cocking yoke 50 under and forward. As the cocking yoke 50 rotates toward the unload position, the force acting on the bail 30 becomes weaker and the dead small animal will fall from the trap and into the container. The user never has to come in contact with the dead animal. The fourth trap position is the resetting position which takes four steps.

Description of the first of the four resetting steps

The user rotates the cocking yoke 50 beyond the unload position and to the setting position. At this position there is a weak force acting on the bail 30 urging it towards the set position. Shown in FIG. 7.

Description of the second of the four trap resetting steps

With the bail 30 in the set position, the user pushes the rear of the release lever 43 up to the not released position which will also move the retention pin 41 down holding the bail 30 in the set position.

Description of the third of four trap resetting steps

With the rear of the release lever 43 pushed up to the not released position and the P-shaped rod 47 rotated to the held position under the release lever 43 and above the solenoid armature 72, the user pulls the solenoid armature 72 out from the solenoid coil 71 to the not energized position.

Description of the fourth of the four trap resetting steps

To add tension to the bail coil springs 34 and 35, the cocking yoke 50 is rotated under the trap to the cocked/tripped position. With the cocking yoke 50 in the cocked/tripped position, the cocking lever locking pin 55 is pushed towards the rear of the trap to its locked position.

Description of the first of the bail's two positions

Referring to FIG. 5. The first position is the bail set position. The bail striking bar 31 is rotated up close to the roof 20 and is being held in position by the release lever retention pin 41.

Description of the second of the bail's two positions

Referring to FIG. 3. The second position is the bail tripped position. The bail striking bar 31 is rotated down close to the base 21.

Description of the release lever's first of two positions

Referring to FIG. 5. The first position is the not released position. The rear end of the release device 40 will be up and the front end will be down. The release lever retention pin 41 will be rotated down in front of the bail striking bar 31 holding it in the bail set position.

Description of the release lever's second of two positions

Referring to FIG. 6. The second position is the released position. The rear end of the release lever 43 will be down and the front end will be up. The release lever retention pin 41 will be rotated to the top position into the cutout 45 in the roof shown in FIG. 1. The bail striking bar 31 will be free to rotate towards the bail tripped position.

Release lever and P-shaped rod functional details

Referring to FIG. 5. When the trap is in the cocked and ready position, the force from the bail main coil springs 34 and 35 will result in an upward force on the front end of the release device 40. The rear end of the release device 40 will be urged downward, but the P-shaped rod 47 will resist any movement. The P-shaped rod will not rotate until the solenoid 70 is energized. Because the front end of the release device 40 is short and the back end is long, there is a good mechanical advantage. The downward pressure of the release lever 43 pushes down on the P-shaped rod 47 close to the rod's center of rotation. The other end, which is a long distance from the center of rotation, is held in place by the solenoid armature 72. The added mechanical advantage of the P-shaped rod 47 and the release device 40 make it possible to control the strong pressure of the bail springs 34 and 35 with a small low power solenoid 70. When the solenoid 70 is energized, the P-shaped rod will rotate down which will allow the release lever 43 to move down and trip the trap.

Description of the cocking yoke's three main positions

Description of the cocking yoke's first of three positions

Referring to FIGS. 3, 4 and 5. The first position is the cocking yoke cocked/tripped position. The cocking yoke 50 is rotated rearward under the trap and locked into position by the cocking yoke locking pin 55. This will exert a strong force from the springs 35 and 36 and on the bail 30. This is the position used to catch small animals. Referring to FIG. 3. When the trap is tripped, the cocking yoke 50 will remain in this position.

Description of the cocking yoke's second of three positions

Referring to FIG. 6. The second position is the cocking yoke unload position. The cocking yoke locking pin 55 is pushed forward to the unlocked position and the cocking yoke 50 is rotated forward and under the trap to the unload position. The bail coil springs 34 and 35 will exert a weak or no force in this position and the trapped small animal will fall from the trap.

Description of the cocking yoke's third of three positions

Referring to FIG. 7. The third position is the cocking yoke setting position. As the cocking yoke 50 is rotated over the roof 20 towards the yoke setting position, the bail striking bar 31 will be urged towards its bail set position by a weak force. Referring to FIG. 5. With the bail striking bar 31 in the bail set position, the release device 40 can be rotated into the retained position. With the bail being retained, the cocking yoke 50 can be returned and locked into the cocked/tripped position.

Description of the yoke position and spring tension

When the cocking yoke is locked in the cocked/tripped position and the bail striking bar 31 is being retained in the bail set position by the release lever retention pin 41, there is a strong force exerted on the bail 30. This strong force will be urging the bail striking bar 31 towards the bail tripped position. After the trap has tripped, a medium amount of the spring tension will remain. When the cocking yoke 50 is in the unload position, there is a weak or zero force on the bail 30. When the cocking yoke 50 is in the setting position, there will be a weak force exerted on the bail 30 urging it towards the bail set position.

Description of the electronics

The 110 volt household power is fed into a power reduction module. The module is insulated and sealed so that there is no high voltage exposed. There is no danger that the user will be exposed to any high voltage. The electronics is powered by safe low voltage circuits.

Referring to FIG. 8. What alternating current voltage is not dropped across the two series capacitors 69 is fed into the full wave bridge 83 and a direct current output voltage less than 25 volts will be at the filter capacitor 73. The 1.5K resistor 75 limits the current through the three light emitting diodes 60, 62, and 66 and the two power diodes 82 to about 7.5 milliamps. The five diodes in series produce a constant voltage drop of about 5 volts which is used to power a CD 4082 80 integrated circuit, the four phototransistors and the alert device 77.

A large electrolytic capacitor 74 is charged through the 10K resistor 76. The charge on this capacitor will be used to energize the solenoid coil 72.

The CD 4082 80 contains two four input AND gates. One AND gate has all of its inputs connected to the infrared phototransistor release lever position detector 65. The output of this gate will be high only when the trap is tripped and is fed to the alert device 77 and to one of the inputs of the second AND gate. The second input to the second AND gate is connected to the phototransistor daylight sensor 64. The third input to the second AND gate is connected to the top phototransistor 61. The fourth input to the second AND gate is connected to the bottom phototransistor 63. The output of the second AND gate will be high when the trap is set and no daylight is being detected and a small animal is blocking both the top and the bottom light beams.

The output of the second AND gate is fed to the gate of the silicon controlled rectifier 78 which will turn on and dump the charge from the big electrolytic capacitor 74 into the solenoid coil 71. The solenoid armature 72 will pull in tripping the trap. When the release lever 43 drops below the light beam, the phototransistor release lever position sensor 65 will turn on and this will turn on the alert device 77 and also turn off the gate signal to the silicon controlled rectifier 78. The 10K resistor 76 restricts the current from the charging source below the holding current of the silicon controlled rectifier 78 and the silicon controlled rectifier 78 will turn off.

Description of the battery powered alternate embodiment

The battery powered small animal trap has all the mechanical features that the preferred embodiment has. The only changes are to the electronics.

The battery powered model uses a microcontroller to turn the light emitting diodes on or off and to monitor all the sensors and trip the trap. It also sends alert signals after the trap has been tripped.

All three light emitting diodes and one resistor are connected in series to one of the output ports. All the phototransistors can be connected directly to an input port, but the trip signal and the alert signal may need to be isolated by a drive transistor or similar device.

The microcontroller may be programmed with extra features that the preferred embodiment does not have. These extra features may include alert signals that play songs or have special repeating patterns. The microcontroller may be programmed to test the battery during start-up and to report low battery conditions. The battery saving sleep feature makes the low cost microcontroller the ideal control device for this electronic small animal trap.

The microcontroller will test the daylight phototransistor 64 to see if it is detecting daylight. If daylight is detected, the controller will enter a long sleep period of about 15 minutes before it tests again.

When no daylight is reported, it will enter a different loop where it will briefly turn on all three light emitting diodes 60, 62 and 66 and read the outputs from the four phototransistors 61, 63, 64 and 65. If both the top and the bottom phototransistor 61 and 63 report that there is no small animal blocking either light beam and the daylight detector 65 is reporting darkness and the release lever position detector 66 is reporting that the trap is in the set position, then the controller will turn off the light emitting diodes and enter a short sleep period of about ½ second long. This is the normal hunt mode where it makes a very short sample about twice a second and goes into a power saving state between samples. Very little battery power is being consumed because the sample period is very short and the microcontroller spends almost all of its time in its sleep mode. The daylight sensor 64 is also sampled each cycle and if daylight is detected it will return the microcontroller back to the darkness wait loop.

When it is reported that both beams are blocked and that there is no daylight and the trap is in the set position, then the microcontroller will send out a trip signal. The trip signal will turn on a transistor which will energize the solenoid 70 and the trap will trip.

Once the release lever 43 drops below the light beam, then the phototransistor release lever detector 65 will send a signal to the microcontroller which will stop sending the trip signal and start sending an alert signal to the alert signal transistor which will turn on the alert device.

Description of the flea killer alternative embodiment

A flea collar is cut into short strips. Several of the strips are inserted between the roof and bail after the trap has been set. The small animal can enter the chamber without making contact with the strips. When a small animal trips the trap the strips will fall onto the dead small animal. The flea killing strips will kill the fleas that were on the small animal before it died.

Description of a one piece yoke alternative embodiment

The preferred embodiment describes a three piece yoke assembly. A one piece yoke is possible using flat metal with two 90 degree bends forming a U-shaped device with about the same dimensions as the three piece yoke.

Description of a one piece bail alternative embodiment

The preferred embodiment describes a three piece bail assembly. A one piece bail is possible using flat metal with two 90 degree bends forming a U-shaped device with about the same dimensions as the three piece bail.

Description of a one piece release device alternative embodiment

The preferred embodiment describes a three piece release device assembly. A one piece release device is possible using one metal rod with two 90 degree bends. The pivot bar 42 is eliminated altogether. The one piece rod would follow a path similar to the path the three piece device followed. Starting from the rear, the new rod enters the notch 44 and makes a 90 degree turn inside the partition 24 and makes a second 90 degree turn and exits the partition 24 through a new notch (not shown) similar to notch 44 but cut into the top center of the partition 24. The horizontal rod section would become a pivot axle and the material between the two notches would become the bearing.

Description of the no P-shaped rod alternative embodiment

The solenoid is mounted to the underside of the roof on the left side near the rear edge. The solenoid is mounted with the armature facing the release lever. The release lever is placed above the armature and then it is manually pulled from the solenoid coil locking the trap in the set position until the solenoid is energized.

Description of the closing door alternative embodiment

A self closing door is added for sanitary reasons to the front of the trap such that the door is held open until after the trap has tripped. This can be done electrically with a solenoid release energized by the alert circuit or it can be done with a mechanical release that operates after the bail has moved. The door is not powered by the main springs of the trap.

CONCLUSION, RAMIFICATIONS, AND SCOPE

The sensitive infrared trigger will detect when a small animal is in a good position for the trap to work effectively and the trap will supply all the energy to detect and trap the small animal.

It will quickly kill rats as well as mice but will not kill birds.

It can signal the user when the trap has tripped and needs attention. This feature can be bypassed in a situation where it is not desired.

It can be set, unloaded and reset easily and does not require strong fingers or manual dexterity. The user's hands and fingers remain in a safe area away from the danger area during setting, unloading and resetting. The user never has to come in contact with the dead small animal.

It has a daylight detector that can be used to disable the trap during daylight hours. This will prevent the trap from harming birds and other animals that are only active during the daylight hours. This feature can be bypassed in a situation where it is not needed.

Household alternating current can safely power the trap. The battery powered alternate embodiment uses a power saving sleep mode which makes it possible to have a long battery life.

The release device 40 together with the p-shaped rod 47 provide a good mechanical advantage making it possible to use a low power type solenoid.

What is claimed is:

1. An electronically controlled trap for trapping small animals comprising:
   (a) an enclosure having a roof, side walls, a base and a partition that divides said enclosure into an accessible front chamber and a restricted rear chamber
   (b) a pivoting U-shaped bail rotatable up to a set position near said roof and rotatable down to a tripped position near said base vertically centered near and parallel to said partition within said front chamber
   (c) a U-shaped cocking yoke pivotally movable from a cocked/tripped position to a setting position pivoting around the same axis as said bail, moveable about said enclosure, said trap may be emptied and reset easily and safely by moving said cocking yoke thereby avoiding contact with trapped small animal
   (d) at least one spring with a first end coupled to said bail and a second end coupled to said cocking yoke such that said bail is urged to pivot with said cocking yoke
   (e) a release device that is manually movable to a not released position holding said bail in said set position
   (f) an electronic means of moving said release device to a released position thereby releasing said bail to move to said tripped position
   (g) a changeable biasing means acting on said bail
   (h) an electronic means of disabling said trap when there is a danger that said trap may harm birds
   (i) an electronic means for sensing when a small animal is positioned where said trap will be effective
   (j) an electronic means of sensing that said trap has been tripped
   (k) an electronic means of sending a signal indicating that said trap has tripped.

2. The electronically controlled trap of claim 1 further includes a cut out area in said partition forming a short dead end tunnel.

3. The trap of claim 2 wherein the tunnel further includes at least one light emitting diode on a first side of said short dead end tunnel sending a beam of light across said short dead end tunnel and at least one phototransistor on a second side of said short dead end tunnel detecting said beam of light, bait is placed within said short dead end tunnel said phototransistor will sense if said beam of light is blocked.

4. The electronically controlled trap of claim 1 wherein said changeable biasing means further includes said cocking yoke moveable from said setting position to said cocked/tripped position, when said cocking yoke is in said setting position there will be a weak bias urging said bail up, when said cocking yoke is in said cocked/tripped position there will be a stronger bias urging said bail down.

5. The electronically controlled trap of claim 1 further includes a cocking yoke locking pin to lock said cocking yoke in said cocked/ripped position.

6. The electronically controlled trap of claim 1 wherein said release device is pivotally mounted near said partition and close to said roof and is moveable to said not released position with a first most forward end of said release device down and a second most rearward end of said release device up, is moveable to said released position with said first most forward end of said release device up and said second most rearward end of said release device down and includes a retention pin on said first most forward end of said release device for holding and releasing said bail.

7. The electronically controlled trap of claim 1 wherein said means of changing said release device from said not released position to said released position, further includes a device selected from a list including a low power solenoid.

8. The electronically controlled trap of claim 1 wherein said means of sensing that a small animal to be trapped is positioned where the trap will be effective consists of at least one light emitting diode and at least one phototransistor working together.

9. The electronically controlled trap of claim 1 wherein means of disabling said trap during daylight hours to prevent harm to birds includes a phototransistor to detect daylight and disable said trap.

10. The electronically controlled trap of claim 1 wherein said means of sending a signal indicating said trap has tripped includes a device selected from a list including piezoelectric transducer and light emitting diode.

11. The electronically controlled trap of claim 1 wherein said means of sensing that said trap has been tripped further includes an infrared light emitting diode and an infrared phototransistor working together to detect that said release device has moved from said not released position to said released position.

* * * * *